US006650843B1

(12) United States Patent

Lohr et al.

(10) Patent No.: US 6,650,843 B1
(45) Date of Patent: Nov. 18, 2003

(54) DEVICE FOR THE OPTICAL TRANSMISSION OF SIGNALS

(75) Inventors: Georg Lohr, Stephanskirchen (DE); Markus Stark, Waizendorf (DE); Hans Poisel, Leinburg (DE)

(73) Assignee: Schleifring und Apparatebau GmbH (DE)

( * ) Notice: Subject to any disclaimer, the term of this patent is extended or adjusted under 35 U.S.C. 154(b) by 0 days.

(21) Appl. No.: 09/068,932

(22) PCT Filed: Nov. 21, 1996

(86) PCT No.: PCT/DE96/02223

§ 371 (c)(1), (2), (4) Date: Sep. 2, 1998

(87) PCT Pub. No.: WO97/19529

PCT Pub. Date: May 29, 1997

(30) Foreign Application Priority Data

Nov. 21, 1995 (DE) ........................................ 195 43 386
Nov. 21, 1995 (DE) ........................................ 195 43 387
Nov. 21, 1995 (DE) ........................................ 195 43 385

(51) Int. Cl.[7] .......................... H04B 10/00; H04B 10/12

(52) U.S. Cl. ....................... 398/156; 398/140; 398/141; 398/151; 398/153; 398/165

(58) Field of Search ................................ 359/173, 154, 359/159, 157, 155

(56) References Cited

U.S. PATENT DOCUMENTS 4,646,086 A * 2/1987 Helzel .................. 340/870.29

* cited by examiner

*Primary Examiner*—Leslie Pascal
*Assistant Examiner*—M. R. Sedighian
(74) *Attorney, Agent, or Firm*—St. Onge Stewart Johnston & Reens LLC

(57) ABSTRACT

Devices for providing optical signal transmissions between a transmitter unit and a receiving unit which is mobile relative to the transmitter unit. The units are optically coupled to each other via an optical transfer medium, and thus improve transmission quality by eliminating, or greatly reducing interferences that affect the transmission quality.

7 Claims, 4 Drawing Sheets

DEVICE FOR THE OPTICAL TRANSMISSION OF SIGNALS

BACKGROUND AND SUMMARY OF THE INVENTION

The invention relates to devices for optical signal transmissions between a transmitter unit and a mobile receiving unit, which are optically coupled to each other via an optical transfer medium.

Optical systems are frequently employed to transmit data and signals. Such systems are fundamentally composed of a transmitter unit and a receiver unit which are interconnected via an optical transfer medium. When the optical transfer medium is free space or air, an arrangement similar to a light barrier is achieved.

However, optical fibers, such as glass or synthetic fibers, are more frequently used to guide the light. In both cases, the length of the optical path between the transmitter unit and the receiving unit is, as a rule, constant. As a result, the amplitude of the signal received in the receiver unit is not subject to significant variations with respect to time. This furnishes a uniform transmission quality.

In the case of transmission paths which have a variable optical path length between the transmitter unit and the receiving unit, the signal level at the receiver may vary accordingly. This is, inter alia, a consequence of the attenuation along the optical path, which may give rise to a varying transmission quality. In advanced digital transmission systems, in particular, this may result in an undesirable increase of the bit error rate.

Another disadvantage of prior art optical transmission systems is due to the finite transit time of the light through the optical transfer medium. This transit time depends on the distance between the transmitter and the receiver, and varies within a range of almost zero when the transmitter is located in the immediate proximity of the receiver, up to a maximum value which occurs when the transmitter unit is located at that end of the optical medium which is remote from the receiver.

When the transmitter moves along the length of the medium, starting from the receiver up to the end of the optical medium, the transit time increases. In the case of a transition of the transmitter from that end of the optical medium which is remote from the receiver, to the medium close to the receiver, initially the light passes through the entire length of the optical medium, resulting in a long transit time prior to arrival at the receiver. When the path length is short, on the one hand, the light arrives at the receiver almost without any transit time. This abrupt difference in transit time, which may occur during the transition, may give rise to a discontinuity in phase, restricting the bandwidth which can be transmitted, and possibly resulting in transmission errors.

Particularly, when optical signals are transmitted via an optical transfer medium shaped in the form of a closed curve, an overlapping at the beginning and the end of the optical medium is unavoidable unless a failure in transmission can be accepted in this position. That is, two signals are superimposed in the receiver, at the beginning and simultaneously at the end of the medium. The first signal reaches the receiver after a short path, and thus also after a short time. The second signal passes over a longer distance, and thus arrives at the receiver with a substantial delay. Both signals are now superimposed and produce an incorrect cumulative signal. As a result, the transmission is adversely affected.

Specifically, with high frequencies where the signal transit time corresponds to one half of the period, the signal is extinguished. In such a case a sensible data transmission is no longer possible.

It is therefore an object of the present invention to improve a device for optical signal transmission between a transmitter unit and a mobile receiving unit (that is, moveable relative to the transmitter unit), which are coupled to each other via an optical transfer medium, such that interferences upon the transmission quality may be largely eliminated.

Another object of the invention is to provide an arrangement, in which the transmission quality is independent of relative movements between the transmitter unit and the receiving unit.

Still another object is to provide such an arrangement in which no signal overlapping occurs at the location of the receiving unit which could interfere with the data transmission. Finally, another object of the invention is to provide a device which requires a small space, involves moderate costs, and is specifically appropriate for wide-band signal transmission.

These and other objects and advantages are achieved by the invention, which is based on the proposition that, a desired independence of the bandwidth of the signal transfer times can be achieved only when the signals are prevented from arriving at the receiver along several paths with different transit times. This means that the independence of the bandwidth of the signal transit times is ensured if only a single signal reaches the receiver. This may be the case, for instance, on a linear path. Independence may equally be achieved when several signals arrive at the receiver, but all signals have the same transit times to the receiver. In the current object of the invention, both features are combined.

In the apparatus according to the invention the light beam propagates within the optical transfer medium such that either optical signals progress along different paths within the transfer medium, so that they arrive concurrently at the location of the receiving unit and can thus be combined to form a single signal, or the transfer medium is designed such that a separate three dimensional signal transmission of the individual light signals is ensured in order to avoid signal overlapping.

In accordance with the objects of the invention, the curve of the optical medium or the transfer medium, respectively, is severed at one location and closed as free of reflections as possible. This separating point is located at that site of the curve from where the signal transit times in all directions of propagation to the receiver are equal. Hence, the light arrives at the receiver along both paths when the transmitter is positioned above the separating point. Here, the signal transit times are precisely equal and signal distortion does not occur. At all other transmitter positions the light progresses along one path to the receiver and along the other path to the separating point where it is absorbed. Hence there is only one light path from the transmitter to the receiver. With such a provision signal transmission over a substantially larger bandwidth is possible.

The inventive relates equally to an optical signal transmission between moving parts. The movement may here be circular, linear or along any other optional curve on the condition that sufficient signal coupling from the transmitter unit to the optical transfer medium is ensured. In the event of linear travel of parts, the term “path length of travel” denotes that length of the path along which the transmitter unit and the receiving unit may be moved relative to each other. In the event of circular movements, it denotes the corresponding part along the periphery of the circle. At maximum, however, it denotes the complete circumference of the circle. The same applies also to any other curve along which a movement may be carried out.

Pursuant to the object of the invention, in order to allow for a simple low-cost implementation of the amplifiers in the receiving unit, the optical path length must be as short as possible. Moreover, optical signals with different transit times must be definitely prevented from arriving at the receiving unit in order to achieve a high bandwidth in transmission.

Of note, due to the shortness of the optical medium, the transmission bandwidth is also substantially wider in the case of reception of several signals with different transit times. This is because the transmission bandwidth is inversely proportional to the length of the optical medium.

Another important aspect of the present invention is the fact that optical transmitters can be produced at low costs while optical receivers are very complex and expensive due to the wide-band amplifiers that are used.

In one embodiment of the present invention, a device for optical signal transmission between a transmitter and a mobile receiving unit which are coupled to each other via an optical transfer medium, is configured such that the transmitter unit includes at least one optical transmitter, which transmits light signals via at least one transfer medium along at least two paths to the receiving unit. The paths extend such that the total path length between the transmitter and receiving units is approximately constant. Furthermore, the receiving unit is designed so that due to summation of the light signals from the different paths, it will receive a cumulative signal. The cumulative signal is approximately independent of the travel time/path between the transmitter and receiving units.

The optical signals are transmitted from the transmitter unit to the receiving unit along at least two paths. Both signal paths are designed so that the cumulative optical path length remains approximately constant and hence independent of the travel. This may be achieved in a simple manner, e.g., when an optical transfer medium such as a glass fibre of constant length is used which has ends leading to the receiving unit and which permits the coupling-in of light from the transmitter unit at any location desired. The receiving unit is designed so that it receives the signals along the optical paths and generates a cumulative signal by summation which is largely independent of the travel path between the transmitter unit and the receiving unit.

In another embodiment of the invention, the receiving unit includes several optical receivers which convert the optical signals into electrical signals. At least one optical receiver is associated with each optical path. The electrical signals of the receivers are then totaled in an adjoining adder.

In another embodiment of the invention, the receiving unit is provided with an optical adder which adds up the optical signals of the paths. After such a summation the cumulative optical signal may be converted into an electrical signal whenever this will be necessary.

In still another embodiment of the invention, the transmission quality can be even further enhanced by means of a selector preceding the adder. When more than two optical paths are available, a logic selector function determines the sub-set of the best signals from these paths. The signal amplitudes, the signal-to-noise ratio, the distortions or other telecommunication signal parameters can optionally be applied as selection criterion. The logic selector function controls the selector in a way that these signals will only be supplied to the adder for summation.

In still another embodiment a light-conducting fibre is used as the transfer medium. Similarly to the prior art, this fibre may be designed as glass fibre, synthetic fibre or a fibre of any other light-conducting material. Moreover, the transfer medium may be a molded light-conducting body. A light-conducting liquid is equally suitable for application as the transfer medium.

According to another feature of the present invention, a linear design of the transfer medium is included. This is to safeguard against linear movement between the transmitter unit and the receiving unit. Further, the linear design is preferably arranged in parallel with the direction of movement.

In a further embodiment of the present invention, in the event of a circular movement between the transmitter unit and the receiving unit, the transfer medium additionally consists of a circular configuration and is preferably disposed in parallel with the direction of movement. Moreover, the transfer medium may consist of a light-conducting fibre in a circular configuration which is doped with a fluorescent dye, so that light may be coupled into the fibre at any desired location.

In still another embodiment of the present invention, the transfer medium is discontinuous at least at one location, from which the transit times of the optical signals in both directions of the transfer medium to the receiving unit are equal.

In a particularly advantageous embodiment of the invention, the optical signals are converted into electrical signals via two optical converters at the receiver site. To this end, the optical medium is interrupted at the receiver site and an optical converter is inserted in each of the branches. Interruption in this sense does not necessarily mean a mechanical severing of the medium. Rather, it must be ensured that the medium is optically separated so that a transition of light from one branch into the other branch will be subjected to a strong attenuation.

The two signals of the optical converters are superimposed via an operational circuit, which may consist of an analog adder or also a digital operational circuit. When the links between the optical converters and the operational circuit equally present inherent transit times or when these optical converters present different transit times, this fact must also be considered in the positioning of the separating point in the transfer medium. This is in order to achieve equal cumulative signal transit times along both paths from the separating point to the operational circuit.

In still another embodiment of the present invention, the optical medium is designed such that a slight overlapping of the two branches of the optical medium occurs at the separating point, or at both separating points if two of them are provided. This provision ensures the transmission of light from each transmitter unit to the receiver unit from any point on the curve. In any case, the overlapping site must be designed so that a perfect separation of the curve branches will be ensured, and light cannot transit from one curve branch to the other branch. The transfer medium is preferably a light-conducting fiber, which may be designed as glass fiber, or even synthetic fiber.

Another embodiment is achieved by doping the fibre with a fluorescent dye so that it is particularly simple to couple light into the fibre at any position of the transmitter unit along the curve.

In an even further embodiment of the present invention, the receiving unit comprises at least one optical receiver which is associated with an optical transfer medium having a length shorter than the path covered from the optical transmitter relative to the transfer medium. Additionally, the transmitter unit includes at least two optical transmitters which are spaced from each other, along the direction of longitudinal travel, such that the light of at least one optical transmitter will be coupled into the transfer medium.

In accordance with the objects of the invention, a short optical medium is employed which covers only one part of the path length, rather than an optical medium into which a transmitter may couple light along the entire traveling path. In the transmitter unit, several optical transmitters are provided so as to allow for an optical transmission over the entire wavelength. These transmitters are arranged such that the optical medium will be continuously illuminated by at least one optical transmitter. In this way, a continuous signal transmission along the entire path length becomes possible.

In an embodiment of the present invention, the receivers of the receiving unit are arranged approximately in the center of the segments of the optical media, rather than at the end of the segments of the optical media (which has so far been common). With this provision the transit times of the optical signals from both ends of the optical medium are equal. As a result, there is no superimposition of optical signals with different transit times which may result in signal distortion and a restriction of the bandwidth.

The optical transmitters of the transmitter unit are arranged such that the distances between them are just wide enough so that as soon as a transmitter leaves an optical medium, a second transmitter precisely approaches this optical medium on the other side. This provision allows for continuous signal transmission. Hence, it is precisely at this point that two optical transmitters couple light into the optical medium. Because the two paths from the optical transmitters to the optical receiver of the receiving unit are equal in length, there are no distortions whatsoever caused by differences in the signal transit times.

In another embodiment of the invention, the receiving unit comprises several optical receivers which are each connected to an optical medium. The receiving unit is designed such that the signals of the optical receivers are combined with each other and a higher signal level or a higher reliability may be achieved by redundancy. It is equally conceivable that the signals from several optical receivers are added for achieving a higher cumulative signal level and reduced noise. It is also possible to combine several signals in order to permit a redundant transmission so that when one transmitter, an optical medium or even a receiver fails, it is still possible to transmit the signals via another path.

In a further embodiment of the present invention, the transmitter unit comprises a position sensor which determines the particular optical transmitter which is instantaneously located above an optical medium. This information is then signaled to the corresponding optical transmitter. With this provision, the optical transmitter can activate the full transmitting power and transmit optical signals. When it leaves the range of the optical medium, this exit is signaled to it and it can reduce or even completely deactivate its transmitting power. Such an arrangement serves to reduce the total power consumption of the transmission system. Due to deactivation of the transmitters their service life is extended, while the creation of electromagnetic noise in the high-power transmitter drivers is reduced.

In even another embodiment of the invention, the receiving unit comprises several independent optical receivers with a separate optical medium. The transmitter unit includes at least as many optical transmitters as there are signal channels. The transmitter unit and/or the receiving unit is thus designed such that it includes an additional selector which is controlled via a position sensor. The position sensor communicates to the selector switch which among the optical transmitters are instantaneously able to transmit signals via the optical medium and the associated receiver to a specified logic signal channel. What is important here is the fact that each signal channel is transmitted via a defined path. Depending on the position of the transmitter and receiving units the transmission path may vary. It must only be ensured that the signals on a particular channel are actually transmitted on the transmitter side to the same channel on the side of the receiving unit.

The mode of operation should be represented here again with reference to a simple example where one selector switch is provided on the side of the transmitter unit. If, for instance, a first transmitter 1 is located above a first receiver 1 the first logic signal channel is actually gated through from the selector switch to the first transmitter. When the device now moves further by a certain distance a second transmitter 2 will be above the first receiver , at "t" a later point of time. Now, the selector switch switches the signals of the first signal channel to the second transmitter so that the latter can transmit its signals to the first receiver again. Upon a further movement of the entire arrangement through a defined distance, a third transmitter is located above the first receiver at a later point of time. Then the selector switch will switch the first signal channel to the third transmitter so that the latter can transmit again its signals to the first receiver, The corresponding schematic applies to all other transmitters, receivers and signal channels equally.

BRIEF DESCRIPTION OF THE DRAWINGS

The invention will now be described in the following by exemplary embodiments with reference to the drawings wherein.

DETAILED DESCRIPTION OF THE INVENTION

Figure 1:
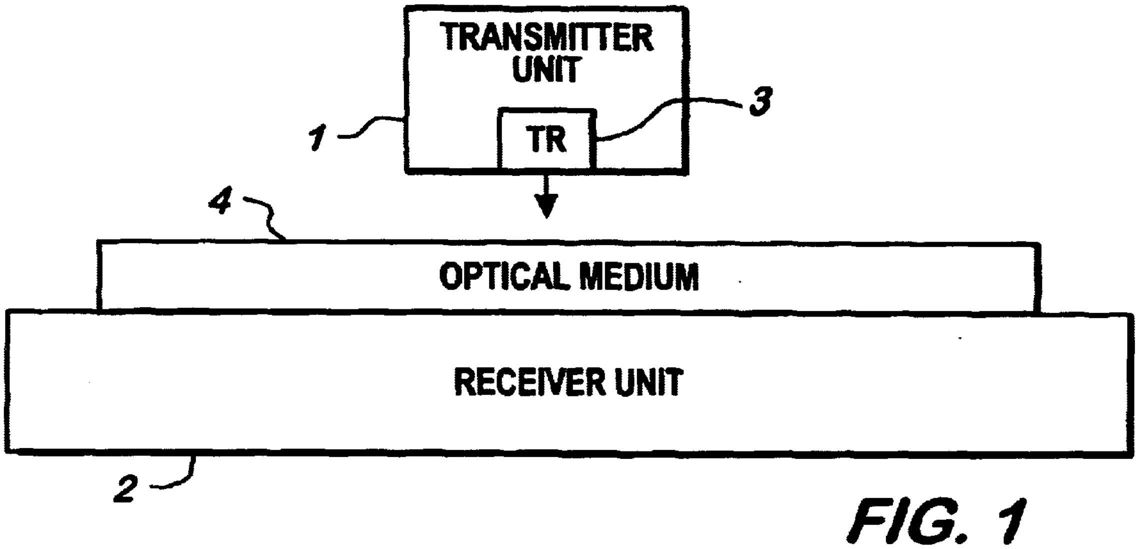
FIG. 1 is a schematic view of an embodiment, according to the invention.

FIG. 1 is a view of an embodiment of the invention, which consists of a transmitter unit 1 and a receiving unit 2. The transmitter unit includes at least one transmitter 3 which relays optical information via the optical medium 4 to the receiving unit 2. The optical medium 4 presents a constant length independent of the position of the transmitter unit 1 relative to the receiving unit 2.

Figure 2:
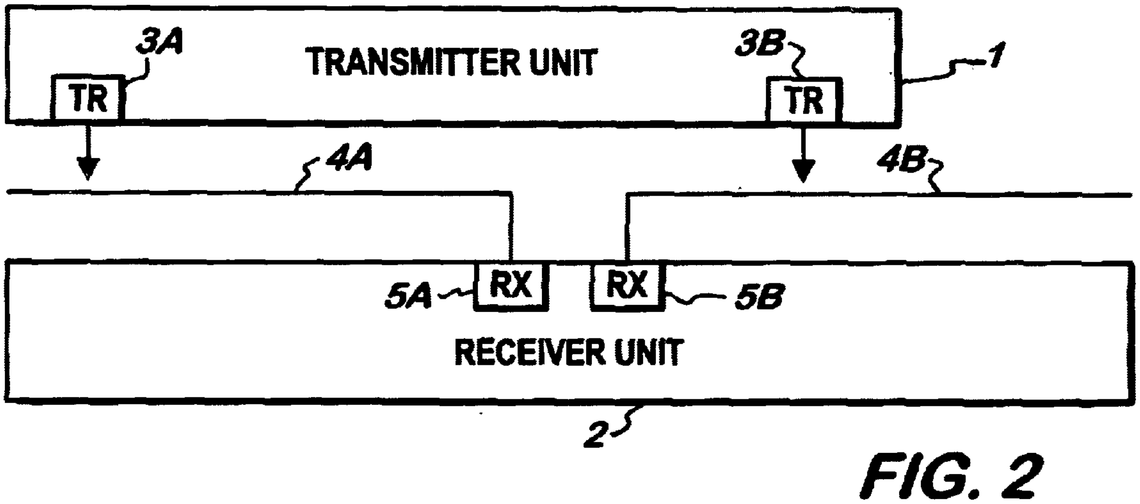
FIG. 2 shows another schematic view of an embodiment, including two transmitter and receiving units, according to the invention.

FIG. 2 is an exemplary illustration of another embodiment of the invention. Here, as previously, the optical medium is arranged such that the entire length of the optical path is constant. As a result of the subdivision of the optical medium into two parts 4A and 4B, at least two transmitters 3A and 3B are correspondingly required. Both transmitters transmit the same information at the same time. Moreover, shown are two optical receivers 5A and 5B which receive the optical signals of the optical medium, for example.

Figure 3:
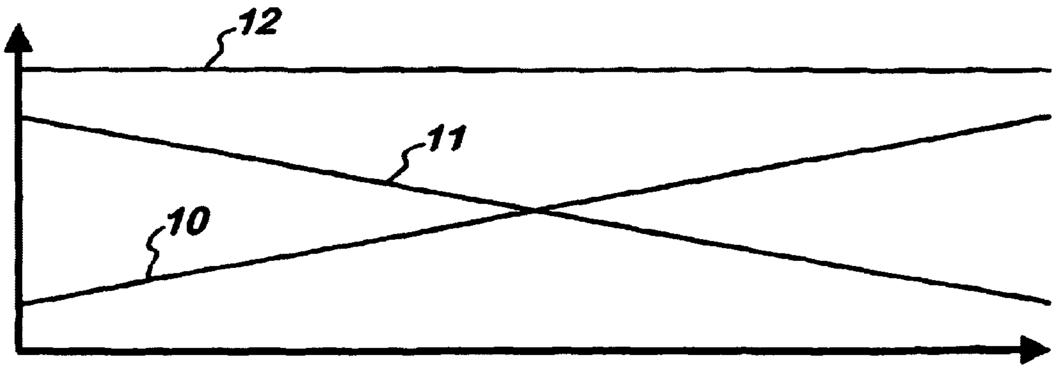
FIG. 3 is an amplitude/locus diagram.

FIG. 3 illustrates, for example, the effects of the addition of two signals on the amplitude of the cumulative signal. The position of the transmitter relative to the receiver is plotted horizontally in the diagram. When the transmitter unit is in the left position, for example, the signal level 10 in the first receiver 5A is lower than the signal level 11 in the second receiver 5B, due to the long optical paths. When the transmitter unit is now moved to the right, the signal level in the first receiver 5A rises, while the signal level in the second receiver 5B falls. In sum, the graph of the cumulative signal 12 is an approximation. This graph is approximately independent of the position.

Figure 4:
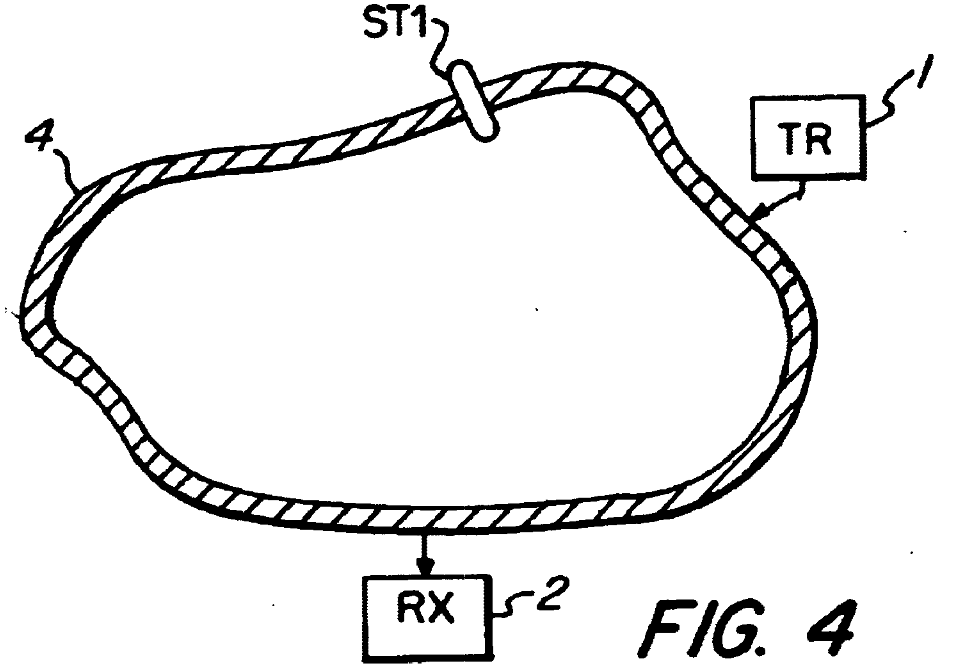
FIG. 4 represents a transfer medium with a separation point, according to the invention.

FIG. 4 shows an embodiment of the invention consisting of a receiving unit 2 and a transmitter unit 1. The units are interconnected by an optical medium 4 of any kind desired which is shaped to constitute a closed curve. The transmitter unit is adapted to be moved relative to the receiving unit along this curve. What is important here is the mutually relative movement.

Likewise, the receiving unit 2 may move together with the optical medium 4 relative to the transmitter unit 1. The optical medium 4 is discontinuous or interrupted at point ST1 from where the transit times of the signals in both branches of the curve are of equal lengths.

Figure 5:
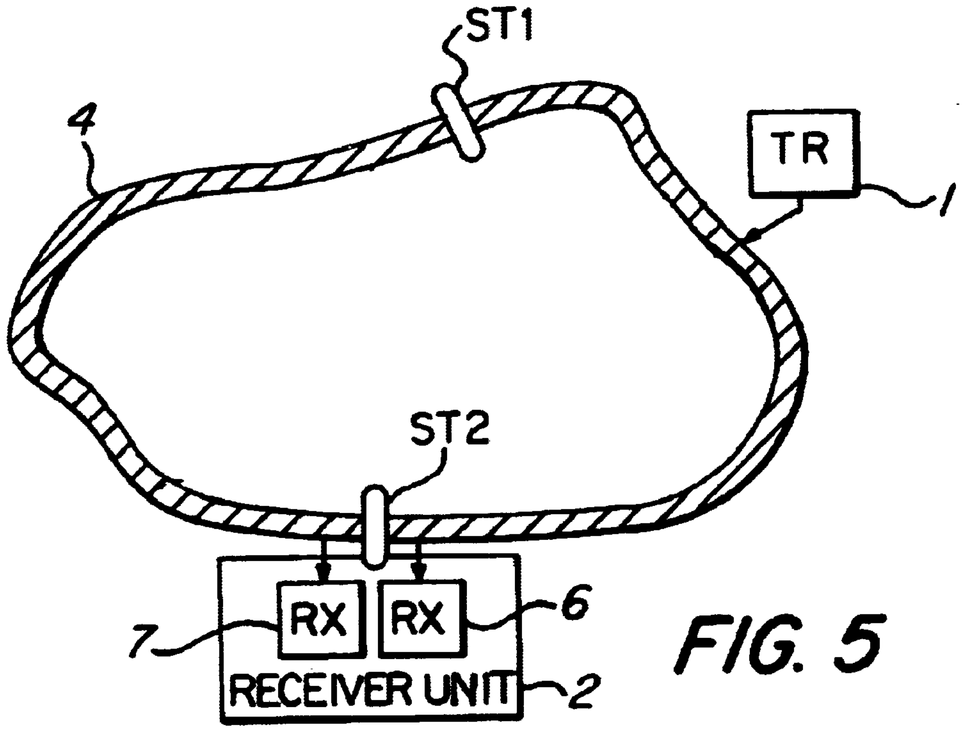
FIG. 5 illustrates another embodiment according to the invention, including two separating points and two optical converters.
Figure 6A:
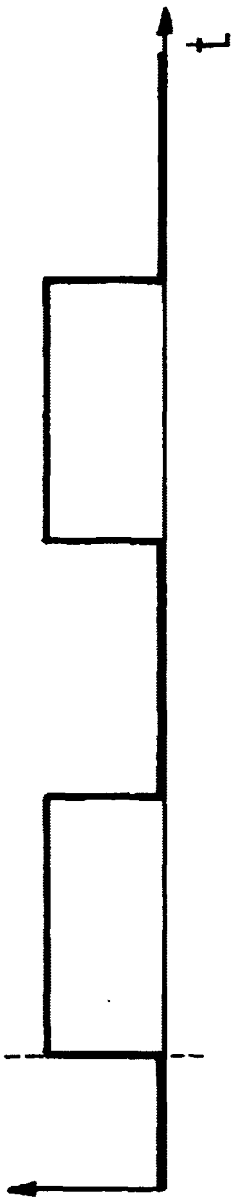
FIG. 6 is a signal/transit time diagram.
Figure 6B:
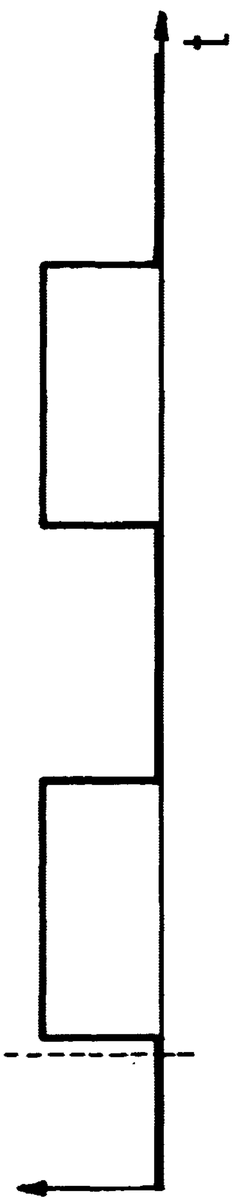
Figure 6C:
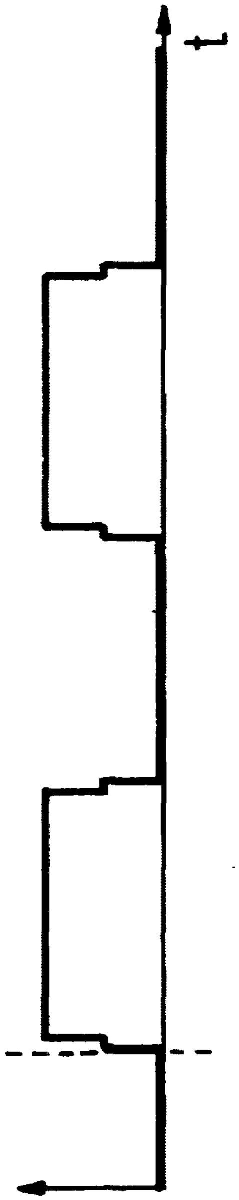
Figure 6D:
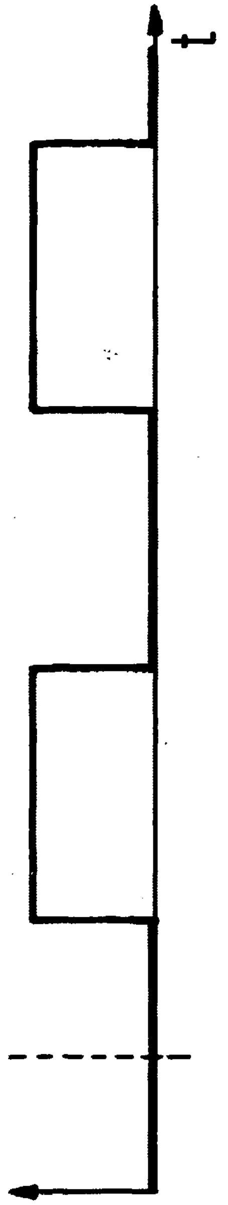
Figure 6E:
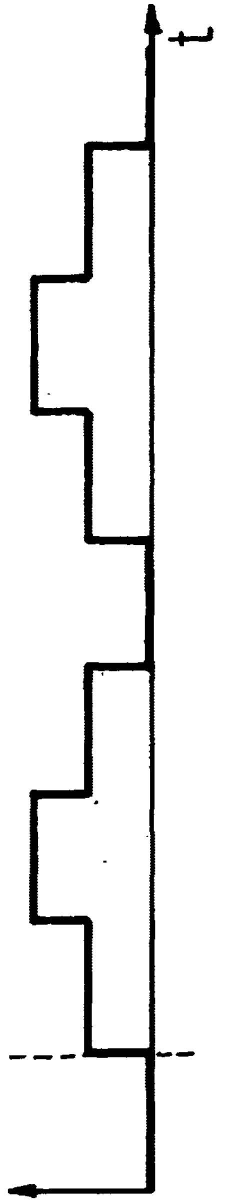

FIG. 5 is an exemplary view of another embodiment of the invention. Here, two optical converters 6 and 7 are provided in the receiving unit 2 which are each associated with one branch of the curve. The optical medium 4 is interrupted at point ST2 between the two optical converters so that light cannot be transmitted from one branch of the curve into the other one.

FIG. 6 clearly shows the effects of the addition of signals with different transit times. Curve (a) corresponds to the original signal. The signal in curve (b) presents only slight delay relative to signal (a). The addition or superimposition of the two curves results in a signal corresponding to curve (c). This signal presents only slight distortions and is easy to evaluate in the receiving unit. In the event of a fairly strong delay of the second signal, e.g., the one represented by curve (d), an entirely different situation occurs. The result is plotted in curve (e). The development of the curve can no longer be unambiguously interpreted. Evaluation becomes particularly complicated in an arrangement that corresponds to the prior art as the signal shape may vary over wide ranges (i.e., as a function of the position of the transmitter relative to the receiver). For instance, the signal shape may have any shape between curves (c) and (d) as a function of the position.

Figure 7:
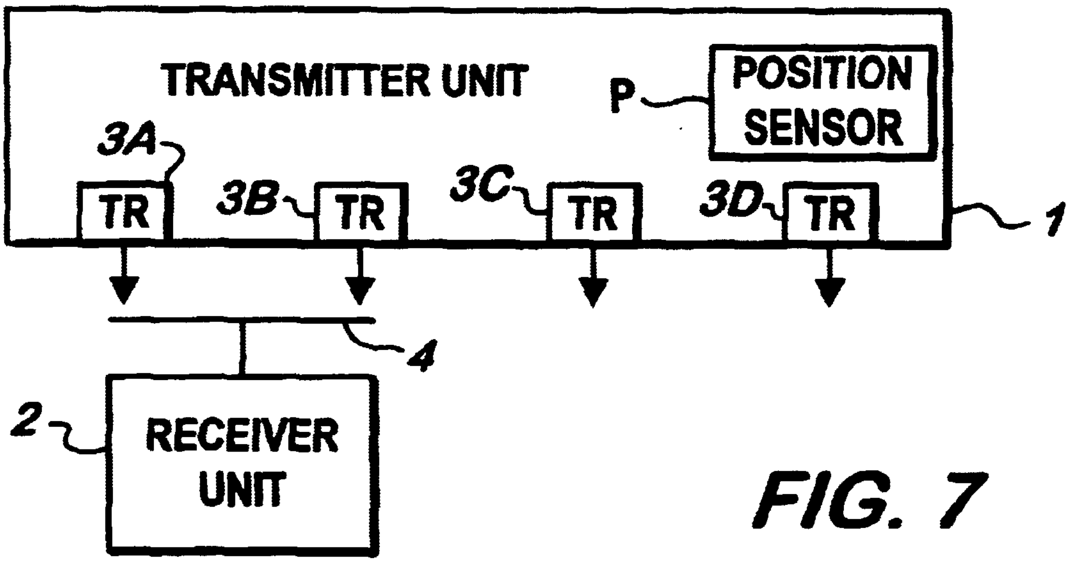
FIG. 7 is a schematic view of another embodiment according to the invention.

FIG. 7 is a view of still another embodiment of the invention, consisting of a transmitter unit 1 and a receiver unit 2. The units are connected to an optical medium 4. The transmitter unit includes several, but at least two, optical transmitters. Some of the optical transmitters are illustrated, for example, as 3A, 3B, 3C, 3D, and are designed so that they are suitable for coupling optical information into the optical medium. These transmitters are arranged such that at least one respective transmitter will couple the signals into the optical medium. The position sensor P determines the position of the optical transmitters and signals the position above an optical medium to the transmitters in such a way that the transmitters may then activate their transmission power.

Figure 8:
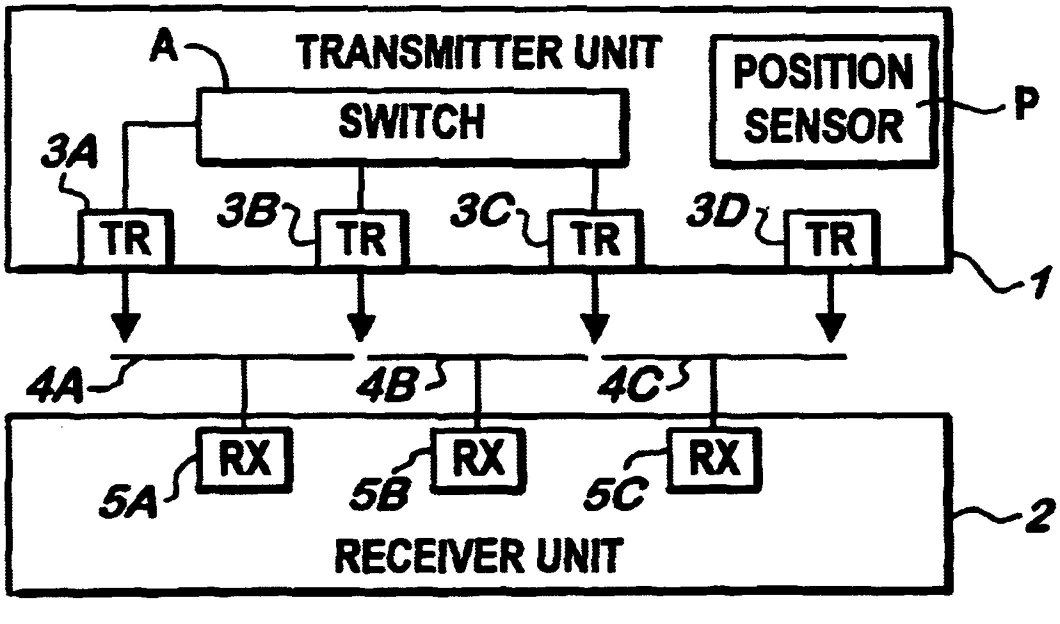
FIG. 8 shows an embodiment, according to the invention, including several receiving units.

FIG. 8 illustrates an exemplary embodiment. Here, the transmitter unit includes a selector switch A which, based on the information from the position sensor P, establishes the logic relationship between the logic signal channels, transmitters and receivers. The receiving unit 2 comprises several optical receivers (5A, 5B, 5C) with the associated optical transfer media (4A, 4B, 4C). Here, some are shown for exemplary purposes. However, at least one channel is provided for each logic signal channel.

What is claimed is:

1. A device for transmitting optical signals between units movable relative to each other comprising:

an optical signal transmitting unit comprising an optical transmitter for transmitting optical signals;

an optical signal receiving unit comprising at least one optical receiver for receiving said optical signals; and an optical transfer medium for coupling the transmitting unit and the receiving unit;

said optical signal transmitting unit being movable along said optical transfer medium relative to said signal receiving unit;

wherein said optical transfer medium is shaped as a closed curve and has a first discontinuity at a position from which two optical signal paths to said optical signal receiving unit are formed and from which the transit times of optical signals along each of said two optical signal paths to said optical signal receiving unit are equal.

2. The device according to claim 1, wherein said optical signal receiving unit further comprises two optical converters for converting the optical signals from each respective optical path to electrical signals, and an operational circuit for electrically combining said electrical signals.

3. The device according to claim 2, wherein said transfer medium has a second discontinuity between said two optical converters such that each optical converter receives light only from an associated optical path.

4. The device according to claim 1, wherein said transfer medium is formed so that said optical paths slightly overlap at said first discontinuity to ensure as optical transmission from any point along said transmission medium.

5. The device according to claim 1, wherein said transfer medium is closed-off at said first discontinuity without an reflection of light occurring.

6. The device according to claim 1, wherein said transfer medium is a light conducting optical fiber.

7. The device according to claim 6, wherein said light-conducting optical fiber is doped with a fluorescent dye.

* * * * *